United States Patent
Knopp et al.

(10) Patent No.: US 10,871,116 B2
(45) Date of Patent: Dec. 22, 2020

(54) METHOD FOR REGULATING A FILLING OF A RESERVOIR OF A CATALYTIC CONVERTER FOR AN EXHAUST GAS COMPONENT AS A FUNCTION OF AN AGING OF THE CATALYTIC CONVERTER

(71) Applicant: Robert Bosch GmbH, Stuttgart (DE)

(72) Inventors: Martin Knopp, Markgroeningen (DE); Alexandre Wagner, Stuttgart (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/590,543

(22) Filed: Oct. 2, 2019

(65) Prior Publication Data

US 2020/0109679 A1  Apr. 9, 2020

(30) Foreign Application Priority Data

Oct. 4, 2018  (DE) .................. 10 2018 216 980

(51) Int. Cl.
*F02D 41/14*  (2006.01)
*F01N 3/18*  (2006.01)
(Continued)

(52) U.S. Cl.
CPC ........... *F02D 41/1458* (2013.01); *F01N 3/18* (2013.01); *F01N 9/007* (2013.01); *F01N 11/007* (2013.01); *F01N 2900/1624* (2013.01)

(58) Field of Classification Search
CPC .. F02D 41/14; F02D 41/1408; F02D 41/1456; F02D 41/1458; F02D 41/0295; F02D 2200/0814; F02D 2200/1408; F02D 2041/1419; F02D 2041/1434; F01N 9/00; F01N 9/007; F01N 3/206; F01N 11/00; (Continued)

(56) References Cited

U.S. PATENT DOCUMENTS 6,823,666 B2 * 11/2004 Odendall ................ F01N 3/035
                                                    423/213.7
7,343,786 B2 *  3/2008 Pfister .................... F01N 11/002
                                                    73/114.75
(Continued)

FOREIGN PATENT DOCUMENTS

DE  102016222418 A1  5/2018

OTHER PUBLICATIONS

Bosch Kraftfahrtechnisches Taschenbuch [Automotive Handbook], 23rd edition (1999), pp. 523-524.

*Primary Examiner* — John Kwon
*Assistant Examiner* — Johnny H Hoang
(74) *Attorney, Agent, or Firm* — Norton Rose Fulbright US LLP; Gerard Messina

(57) ABSTRACT

A method is presented for regulating a filling of an exhaust gas component reservoir of a catalytic converter in the exhaust of an internal combustion engine. Using a first catalytic converter model, an actual fill level of the exhaust gas component reservoir is ascertained. An aging state of the catalytic converter is determined; and a set of model parameters of the first catalytic converter model is allocated to the aging state; the individual model parameters being ascertained by interpolation from basic values of model parameters, the basic values having been determined for at least two different aging states of a catalytic converter of identical design.

14 Claims, 4 Drawing Sheets

(51) Int. Cl.
*F01N 9/00* (2006.01)
*F01N 11/00* (2006.01)

(58) Field of Classification Search
CPC .......... F01N 11/007; F01N 2900/0406; F01N 13/099–0097
USPC ........ 701/102, 108, 109, 114, 115; 123/443, 123/672, 703, 704
See application file for complete search history.

(56) References Cited

U.S. PATENT DOCUMENTS

| | | | |
|---|---|---|---|
| 2009/0151323 A1* | 6/2009 | Severin | F01N 3/0814 60/276 |
| 2012/0035831 A1* | 2/2012 | Kidokoro | F02D 41/1441 701/104 |
| 2012/0290192 A1* | 11/2012 | Okazaki | F02D 41/1454 701/103 |
| 2014/0250993 A1* | 9/2014 | Aoki | F02D 41/1441 73/114.75 |
| 2016/0273466 A1* | 9/2016 | Nakagawa | F01N 3/20 |
| 2017/0037757 A1* | 2/2017 | Tanaka | F02D 41/0235 |
| 2018/0347489 A1* | 12/2018 | Inoshita | B01D 53/944 |

* cited by examiner

METHOD FOR REGULATING A FILLING OF A RESERVOIR OF A CATALYTIC CONVERTER FOR AN EXHAUST GAS COMPONENT AS A FUNCTION OF AN AGING OF THE CATALYTIC CONVERTER

CROSS REFERENCE

The present application claims the benefit under 35 U.S.C. § 119 of German Patent Application No. DE 102018216980.2 filed on Oct. 4, 2018, which is expressly incorporated herein by reference in its entirety.

FIELD

The present invention relates to a method for regulating a filling of an exhaust gas component reservoir of a catalytic converter in the exhaust of an internal combustion engine. The present invention also relates to a control unit.

BACKGROUND INFORMATION

German Patent Application No. DE 10 2016 222 418 A1 describes a conventional method and control unit, in which regulation of a filling of an exhaust gas component reservoir of a catalytic converter in the exhaust of an internal combustion engine occurs using a first catalytic converter model to which, in addition to further signals, signals of a first exhaust gas probe that projects into the exhaust gas flow upstream from the catalytic converter and detects a concentration of the exhaust gas constituent are delivered, and an actual fill level of the exhaust gas component reservoir is ascertained. In this context, a lambda setpoint is calculated; a predetermined fill level setpoint is converted into a baseline lambda setpoint; and a deviation of the actual fill level from the predetermined fill level setpoint is ascertained and is processed by a fill level regulation system to yield a lambda setpoint correction value. A sum is calculated from the baseline lambda setpoint and the lambda setpoint correction value, and the sum is used to calculate a correction value with which a metering of fuel to at least one combustion chamber of the internal combustion engine is influenced.

In the event of incomplete combustion of the air/fuel mixture in a spark-ignited engine, a plurality of combustion products, of which hydrocarbons (HC), carbon monoxide (CO), and nitrogen oxides ($NO_x$) are subject to regulatory limits, are emitted in addition to nitrogen ($N_2$), carbon dioxide ($CO_2$) and water ($H_2O$). According to the related art, the relevant exhaust gas limits can be complied with only by catalytic exhaust gas post-treatment. The aforesaid pollutant components can be converted by using a three-way catalytic converter.

A simultaneously high conversion rate for HC, CO, and $NO_x$ in three-way catalytic converters is achieved only in a narrow lambda range around the stoichiometric operating point (lambda=1) called the "conversion window."

In present-day engine control systems, a lambda regulation system that is based on the signals of lambda probes located before and after the three-way catalytic converter is typically used to operate the three-way catalytic converter in the conversion window. In order to regulate lambda (excess-air factor), which is an indicator of the composition of the fuel/air ratio of the internal combustion engine and thus also an indicator of the oxygen concentration in the exhaust gas before the three-way catalytic converter, the oxygen content of the exhaust gas before the three-way catalytic converter is measured using a front exhaust gas probe disposed there. Based on that measured value, the regulation system corrects the fuel quantity or injection pulse width, which is predefined in the form of a baseline value of a pilot control function. In the context of pilot control, baseline values of fuel quantities to be injected are predefined, for example, on the basis of the rotation speed and load of the internal combustion engine. For even more accurate regulation, the oxygen concentration of the exhaust gas downstream from the three-way catalytic converter is additionally detected using a further exhaust gas probe. The signal of this rear exhaust gas probe is used for a master regulation operation that is overlaid on the lambda regulation before the three-way catalytic converter which is based on the signal of the front exhaust gas probe. It is usual to use, as the exhaust gas probe disposed after the three-way catalytic converter, a step-change lambda probe that possesses a very steep characteristic curve at lambda=1 and can therefore indicate lambda=1 very accurately (Kraftfahrzeugtechnisches Taschenbuch [Automotive Handbook], 23rd edition, page 524).

In addition to the master regulation system, which generally corrects only small deviations from lambda=1 and is designed to be comparatively slow, present-day engine control systems usually contain a functionality in the form of a lambda pilot control system that, following large deviations from lambda=1, ensures that the conversion window is rapidly returned to; this is important, for example, after phases with a coasting shutoff in which the three-way catalytic converter becomes loaded with oxygen. This has a negative effect on $NO_x$ conversion. Because of the oxygen storage capability of the three-way catalytic converter, a lambda=1 condition can still exist for several seconds downstream from the three-way catalytic converter even after a rich or lean lambda has been established before the three-way catalytic converter. This ability of the three-way catalytic converter to temporarily store oxygen is utilized in order to compensate for brief deviations from lambda=1 before the three-way catalytic converter. If a lambda not equal to 1 exists over a longer period before the three-way catalytic converter, the same lambda will also become established after the three-way catalytic converter as soon as the oxygen fill level, for a lambda>1 (oxygen excess), exceeds the oxygen storage capability; or, for a lambda<1, no further oxygen is stored in the three-way catalytic converter. At that point in time, a step-change lambda probe after the three-way catalytic converter also indicates a departure from the conversion window. Until that point in time, however, the signal of the lambda probe located after the three-way catalytic converter does not indicate the impending breakout, and a master regulation function based on that signal often reacts so late that fuel metering can no longer react in timely fashion before a breakout. The result is that elevated tailpipe emissions occur. Present-day regulation concepts therefore have the disadvantage that based on the voltage of the step-change lambda probe after the three-way catalytic converter, they detect only in delayed fashion a departure from the conversion window.

An alternative to regulation of the three-way catalytic converter on the basis of a lambda probe after the three-way catalytic converter is regulation of the average oxygen fill level of the three-way catalytic converter. This average fill level is not measurable, but in accordance with the German Patent Application No. DE 10 2016 222 418 A1 can be modeled by calculations.

SUMMARY

In accordance with an example embodiment of the present invention, an aging state of the catalytic converter is determined, and a set of model parameters of the first catalytic converter model is allocated to the aging state. The individual model parameters are ascertained by interpolation from basic values of model parameters, the basic values having been determined for at least two different aging states of a catalytic converter of identical design.

Regulation of the fill level of the three-way catalytic converter based on the signal of an exhaust gas probe disposed before the three-way catalytic converter has the advantage that an impending departure from the catalytic conversion window can be recognized earlier than with a master regulation system that is based on the signal of an exhaust gas probe disposed after the three-way catalytic converter. As an advantageous consequence, the departure from the catalytic conversion window can then be counteracted by a prompt, targeted correction of the air/fuel mixture. The present invention makes possible, in this context, an improved regulation system for an oxygen quantity that is stored in the catalytic-converter volume, with which system a departure from the conversion window is promptly recognized and prevented and which at the same time has, in order to counteract dynamic disruptions, a more balanced fill level reserve than existing regulation concepts. The robustness of the model-based regulation system can be improved as a result of the manner according to the present invention in which the modeled fill level is corrected and model parameters are adapted to the aging state of the catalytic converter. Emissions can thereby be reduced. Stricter regulatory requirements can be complied with at lower cost for the three-way catalytic converter. The accuracy of the first catalytic converter model is improved by the use of the values of the model parameters which depend on the aging state of the catalytic converter. In particular, the modeling of dynamic processes such as those that occur upon changes in the load and/or rotation speed of the internal combustion engine is improved. The improved modeling results in an improvement in regulation of the oxygen fill level.

A preferred embodiment is notable for the fact that in a first control loop, a lambda regulation operation occurs in which the signal of a first exhaust gas probe disposed upstream from the catalytic converter is processed as an actual lambda value; and that the lambda setpoint is calculated in a second control loop; the predetermined fill level setpoint being converted, by the second catalytic converter model inverse to the first catalytic converter model, into a baseline lambda setpoint of the lambda control system; in parallel therewith a fill level system deviation being calculated as a deviation of the fill level, modeled with the first catalytic converter model, from the filtered fill level setpoint; that fill level system deviation being delivered to a fill level regulation algorithm that calculates therefrom a lambda setpoint correction value; and that lambda setpoint correction value being added to the baseline lambda setpoint calculated by the inverse second catalytic converter model; and the sum thereby calculated constituting the lambda setpoint.

It is also preferred that the first catalytic converter model be a constituent of a system model that has an initial lambda model in addition to the first catalytic converter model.

A "system model" is understood here as an algorithm that associates input variables, which also act on the real object simulated by the system model, with output variables, in such a way that the calculated output variables correspond as accurately as possible to the output variables of the real object. In the instance considered, the real object is the entire physical "system" located between the input variables and the output variables. The signal of the rear exhaust gas probe is computationally modeled with the output lambda model.

It is furthermore preferred that the first catalytic converter model have an input emissions model, a fill level model, and an emissions model; and that the allocation of model parameters occur individually for the input emissions model and for the fill level and emissions model.

A further preferred embodiment is notable for the fact that model parameters of a set of model parameters are ascertained by interpolation.

It is also preferred that the basic values predetermined for at least two different aging states of a catalytic converter of identical design be oxygen storage capacities.

It is further preferred that the oxygen storage capacities be determined for various operating points that are defined by the exhaust gas mass flow and the catalytic converter temperature, and be stored in characteristics diagrams in the control unit. A further preferred embodiment is notable for the fact that relevant basic values of model parameters are also stored in those, or in further, characteristics diagrams.

It is also preferred that a current oxygen storage capacity OSCcurr be determined repeatedly at predetermined intervals by an onboard diagnosis system.

It is further preferred that basic values of an oxygen storage capacity and of a model parameter be determined with reference to a current oxygen capacity OSCcurr determined for an exhaust gas mass flow and a catalytic converter temperature; and that a relevant current value of the model parameter MPcurr be ascertained by interpolation for that exhaust gas mass flow and that catalytic converter temperature, and for the relevant current oxygen storage capacity OSCcurr.

A further preferred embodiment is notable for the fact that, in order to ensure desirably accurate modeling, it is carried out for each model parameter MP that is to be adapted to changing catalytic converter temperatures and/or exhaust gas mass flows.

It is also preferred that one model parameter be a reaction constant of a reaction equation which describes a storage, release, and conversion of reducing exhaust gas components; and/or that one model parameter be a reaction constant of a reaction equation which describes a storage, release, and conversion of oxidizing exhaust gas components.

It is further preferred that a fill level setpoint of the catalytic converter with oxygen be defined as a function of an aging of the catalytic converter.

With reference to embodiments of the control unit, it is preferred that it be configured to control an execution of a method in accordance with one of the preferred embodiments of the method.

Further advantages of the present invention are evident from the description herein and from the Figures.

It is understood that the features described above and those yet to be explained below are usable not only in the respective combination indicated but also in other combinations or in isolation, without departing from the scope of the present invention.

Exemplifying embodiments of the present invention are depicted in the Figures and are explained in further detail in the description below. Identical reference characters in different Figures respectively identify elements that are identical or at least comparable in terms of their function.

DETAILED DESCRIPTION OF EXAMPLE EMBODIMENTS

The present invention is described below using the example of a three-way catalytic converter, and for oxygen as an exhaust gas component that is to be stored. The present invention is also applicable analogously, however, to other types of catalytic converters and to other exhaust gas components such as nitrogen oxides and hydrocarbons. In the interest of simplicity, what follows is based on an exhaust system having one three-way catalytic converter. The present invention is also applicable analogously to exhaust systems having several catalytic converters. The front and rear zones described below can extend in that case over several catalytic converters or can be located in different catalytic converters.

Figure 1:
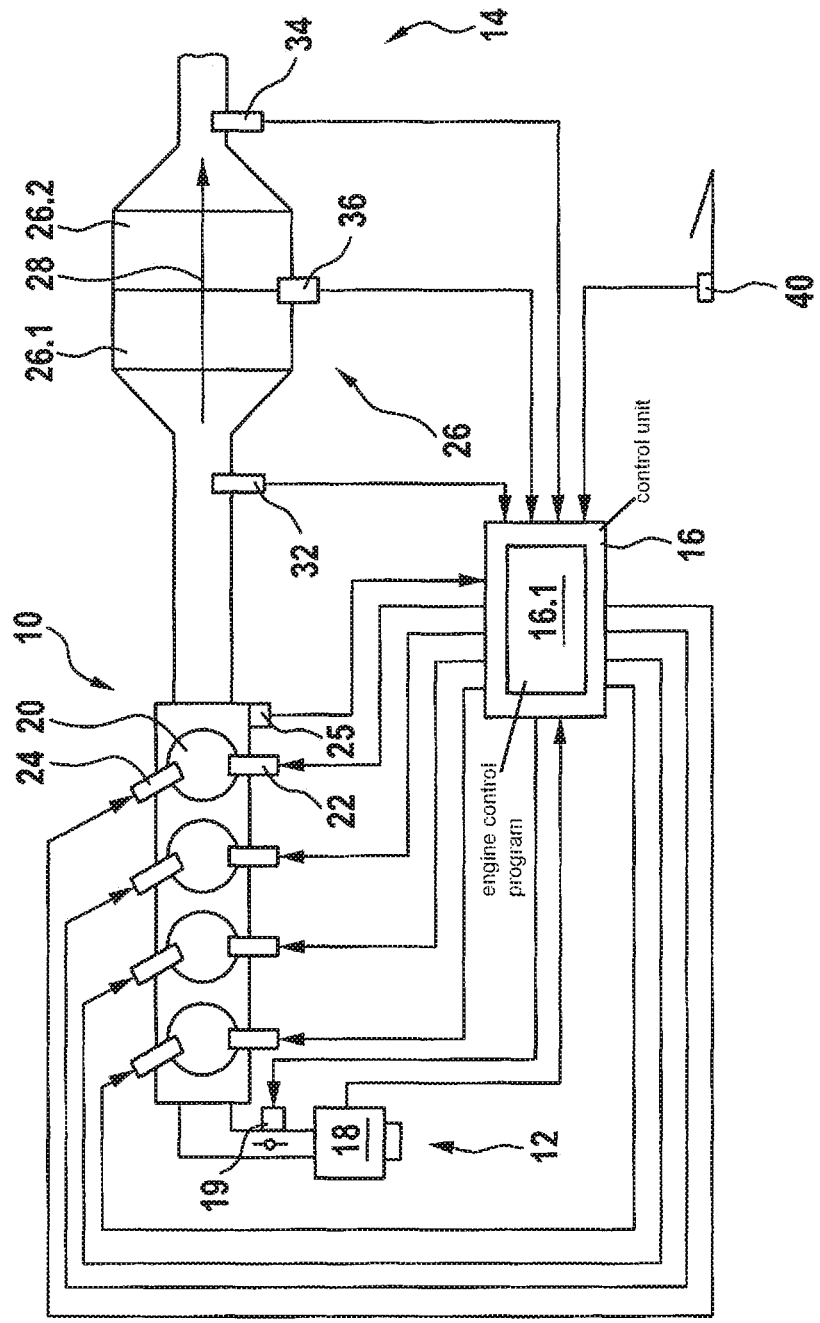
FIG. 1 shows an internal combustion engine having an exhaust system, constituting the technical environment of the present invention.

FIG. 1 shows an internal combustion engine 10 having an air delivery system 12, an exhaust system 14, and a control unit 16. An air mass sensor 18, and a throttle flap, disposed downstream from air mass sensor 18, of a throttle valve unit 19, are disposed in air delivery system 12. The air flowing via air delivery system 12 into internal combustion engine 10 is mixed in combustion chambers 20 of internal combustion engine 10 with gasoline that is injected via injection valves 22 directly into combustion chambers 20. The resulting combustion chamber charges are ignited with ignition apparatuses 24, for example spark plugs, and combusted. A rotation angle sensor 25 detects the rotation angle of a shaft of internal combustion engine 10, and thereby permits control unit 16 to trigger the ignition events at predetermined angular positions of the shaft. The exhaust gas resulting from the combustion events is discharged via exhaust system 14.

Exhaust system 14 has a catalytic converter 26. Catalytic converter 26 is, for instance, a three-way catalytic converter that, as is conventional, converts the three exhaust gas constituents nitrogen oxides, hydrocarbons, and carbon monoxide on three reaction pathways, and has an oxygen-storing effect. In the example depicted, three-way catalytic converter 26 has a first zone 26.1 and a second zone 26.2. Exhaust gas 28 flows through both zones. The first, front zone 26.1 extends in a flow direction over a front region of three-way catalytic converter 26. The second, rear zone 26.2 extends, downstream from first zone 26.1, over a rear region of three-way catalytic converter 26. Further zones, for which the respective fill level is likewise modeled as applicable, can of course be located before front zone 26.1 and after rear zone 26.2, and between the two zones.

Upstream from three-way catalytic converter 26, a front exhaust gas probe 32 exposed to exhaust gas 28 is disposed immediately before three-way catalytic converter 26. Downstream from three-way catalytic converter 26, a rear exhaust gas probe 34 that is likewise exposed to exhaust gas 28 is disposed immediately after three-way catalytic converter 26. Front exhaust gas probe 32 is preferably a broadband lambda probe that permits a measurement of the excess-air factor A over a wide range of excess-air factor. Rear exhaust gas probe 34 is preferably a so-called step-change lambda probe with which the excess-air factor λ=1 can be measured particularly accurately, since the signal of this exhaust gas probe 34 changes abruptly at that point (see Bosch, Kraftfahrzeugtechnisches Taschenbuch [Automotive Handbook], 23rd edition, page 524).

In the exemplifying embodiment depicted, a temperature sensor 36 exposed to exhaust gas 28 is disposed in three-way catalytic converter 26 in thermal contact with exhaust gas 28, and detects the temperature of three-way catalytic converter 26.

Control unit 16 processes the signals of air mass sensor 18, of rotation angle sensor 25, of front exhaust gas probe 32, of rear exhaust gas probe 34, and of temperature sensor 36, and calculates therefrom control application signals in order to adjust the angular position of the throttle valve, trigger ignition events by ignition apparatus 24, and inject fuel by way of injection valves 22. Alternatively or additionally, control unit 16 also processes signals of other or further sensors for applying control to the actuating members depicted or also to further or other actuating members, for instance the signal of a driver input generator 40 that detects an accelerator position. A coasting mode with shutoff of fuel delivery is triggered, for example, by releasing the accelerator pedal. This function, and the functions yet to be explained below, are performed by an engine control program 16.1 that executes in control unit 16 during the operation of internal combustion engine 10.

Herein, a system model 100, a catalytic converter model 102, an inverse catalytic converter model 104 (see FIG. 3), and an output lambda model 106 are used.

Figure 2:
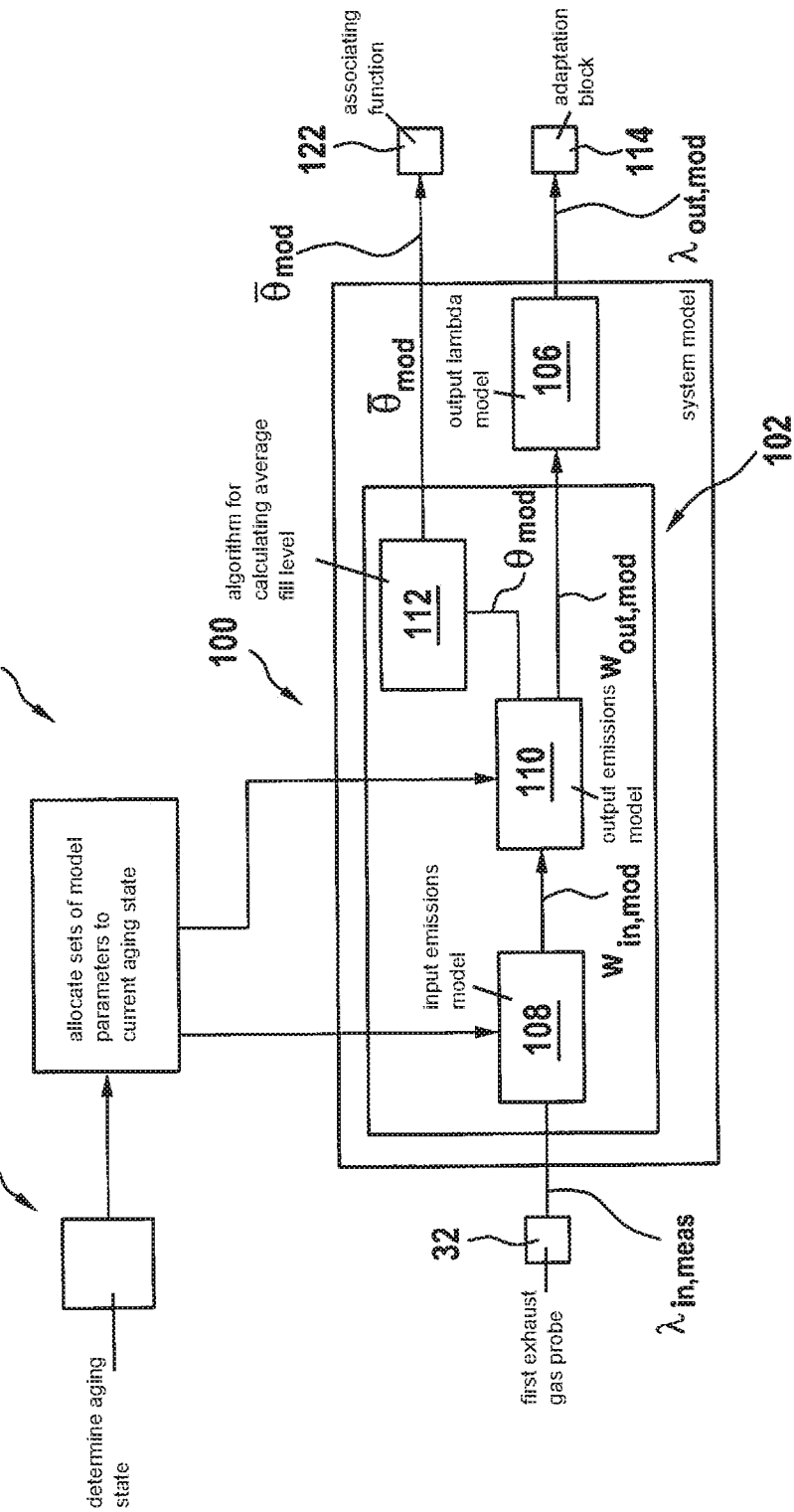
FIG. 2 is a functional block depiction of a system model.

FIG. 2 is a functional block depiction of a system model 100. System model 100 is made up of catalytic converter model 102 and output lambda model 106. Catalytic converter model 102 encompasses an input emissions model 108 and a fill level and output emissions model 110. Catalytic converter model 102 furthermore has an algorithm 112 for calculating an average fill level $\bar{\theta}_{mod}$ of catalytic converter 26. Each model is an algorithm that is executed in control unit 16 and that associates input variables, which also act on the real object simulated with the computational model, with output variables in such a way that the calculated output variables correspond as accurately as possible to the output variables of the real object.

Input emissions model 108 is configured to convert the signal $\lambda_{in,meas}$ of exhaust gas probe 32 disposed before three-way catalytic converter 26, constituting an input variable, into input variables $w_{in,mod}$ required for the downstream fill level model 110. For example, a conversion of lambda into the concentrations of $O_2$, $CO$, $H_2$, and $HC$ before three-way catalytic converter 26 using input emissions model 108 is advantageous.

With the variables $w_{in,mod}$ calculated by input emissions model 108, and optionally additional input variables (e.g. exhaust gas temperature or catalytic converter temperature, exhaust gas mass flow, and current maximum oxygen storage capacity of three-way catalytic converter 26), a fill level $\theta_{mod}$ of three-way catalytic converter 26, and concentrations $w_{out,mod}$ of the individual exhaust gas components at the output of three-way catalytic converter 26, are modeled in fill level and output emissions model 110.

In order to allow filling and emptying processes to be modeled more realistically, three-way catalytic converter 26 is preferably notionally divided by the algorithm into several zones or partial volumes 26.1, 26.2 located one behind another in the flow direction of exhaust gases 28, and the concentrations of the individual exhaust gas constituents are ascertained for each of these zones 26.1, 26.2 with the aid of the reaction kinetics. These concentrations can in turn be respectively converted into a fill level of the individual zones 26.1, 26.2, preferably into the oxygen fill level normalized to the current maximum oxygen storage capacity.

The fill levels of individual, or all, zones 26.1, 26.2 can be combined by suitable weighting into a total fill level that reflects the state of three-way catalytic converter 26. In the simplest case, for instance, the fill levels of all zones 26.1, 26.2 can all be weighted equally, and an average fill level can thereby be ascertained. With suitable weighting, however, it is also possible to take into account the fact the fill level in a comparatively small zone 26.2 at the output of three-way catalytic converter 26 is critical in terms of the instantaneous exhaust gas composition after three-way catalytic converter 26, while the fill level in zone 26.1 located before it, and the development thereof, are critical in terms of the development of the fill level in that small zone 26.2 at the output of three-way catalytic converter 26. In the interest of simplicity, an average oxygen fill level will be assumed hereinafter.

The algorithm of output lambda model 106 converts the concentrations $w_{out,mod}$ of the individual exhaust gas components at the output of catalytic converter 26, calculated with catalytic converter model 102, for adaptation of system model 100, into a signal $\lambda_{out,mod}$ that can be compared with the signal $\lambda_{out,meas}$ of exhaust gas probe 34 disposed after catalytic converter 26. It is preferably the lambda after three-way catalytic converter 26 that is modeled.

System model 100 thus serves on the one hand to model at least one average fill level $\overline{\theta}_{mod}$ of catalytic converter 26, which is corrected to a fill level setpoint at which catalytic converter 26 is definitely within the catalytic conversion window. On the other hand, system model 100 makes available a modeled signal $\lambda_{out,mod}$ of exhaust gas probe 34 located after catalytic converter 26. The manner in which this modeled signal $\lambda_{out,mod}$ of the rear exhaust gas probe 34 is advantageously used to adapt system model 100 will be explained in further detail later on.

In block 200, a determination is made of the current aging state of catalytic converter 26, and in block 202 an allocation of sets of model parameters of first catalytic converter model 102 to the current aging state of catalytic converter 26 occurs. In the embodiment depicted, the allocation of model parameters occurs individually for each sub-model 108, 110 of first catalytic converter model 102.

Figure 3:
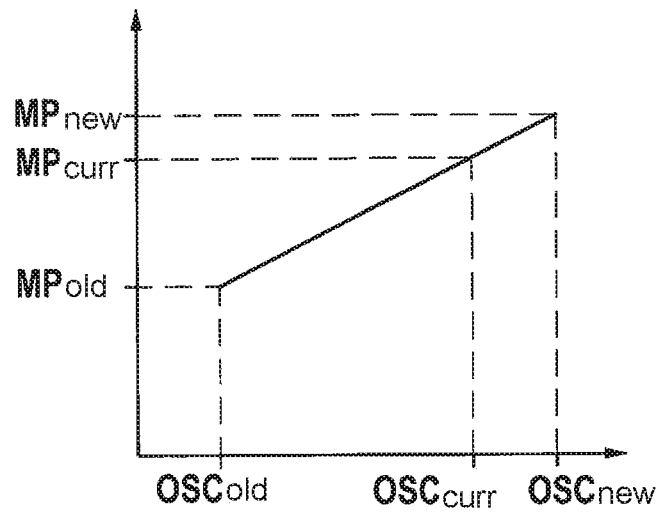
FIG. 3 illustrates ascertainment of a single model parameter of a set of model parameters by interpolation.

FIG. 3 illustrates the manner in which an individual model parameter of a set of model parameters is ascertained by interpolation. Values for oxygen storage capacities OSC of catalytic converter 26 are plotted on the abscissa. "OSCnew" is an oxygen storage capacity of catalytic converter 26 (or of a catalytic converter of identical design) in a comparatively new state, while "OSCold" is an oxygen storage capacity of such a catalytic converter in a comparatively old state. "OSCcurr" is the current oxygen storage capacity of catalytic converter 26.

The oxygen storage capacity is an indicator of the aging state of the catalytic converter. It is ascertained in each case by the fact that a catalytic converter emptied of oxygen is filled with oxygen until second exhaust gas probe 34 reacts. Control unit 16 knows the exhaust gas mass flow and its oxygen concentration, so that the inputted oxygen quantity can be determined by integration of the exhaust gas mass flow, having an excess of oxygen, which is required for filling. This quantity corresponds to the oxygen storage capacity. Analogously, the oxygen storage capacity can also be determined starting from a catalytic converter filled with oxygen, in combination with an exhaust gas mass flow that has an oxygen deficit.

Oxygen storage capacities OSCnew and OSCold are determined, for instance, via test-stand experiments in which data are provided to a control unit that is representative of control units 16 of internal combustion engines of the same type, and are transferred to those control units 16.

The values are determined for various operating points that are defined by the exhaust gas mass flow and the catalytic converter temperature, and are stored in corresponding characteristics diagrams in the control unit. Relevant basic values (MPold, MPnew) of model parameters are also stored in these or in further characteristics diagrams. Values of a model parameter MP of catalytic converter model 102 are plotted on the ordinate. The result is to produce as applicable, for values of the exhaust gas mass flow and catalytic converter temperature which differ from one another, respective different pairs of basic values of an oxygen storage capacity and a model parameter of catalytic converter model 102.

During subsequent operation of an internal combustion engine of this kind, the current oxygen storage capacity OSCcurr is repeatedly determined at predetermined time intervals by an onboard diagnostic system. With respect to a current oxygen capacity OSCcurr determined for an exhaust mass flow and a catalytic converter temperature, the points defined by the pairs of basic values of an oxygen storage capacity and a model parameter for that exhaust gas mass flow and that catalytic converter temperature are determined. A relevant current value of the model parameter MPcurr is obtained by interpolation from those points and from the relevant current oxygen storage capacity OSCcurr:

$$(MPcurr-MPold)/(OSCcurr-OSCold)=(MPnew-MPold)/(OSCnew-OSCold)$$

Figure 4:
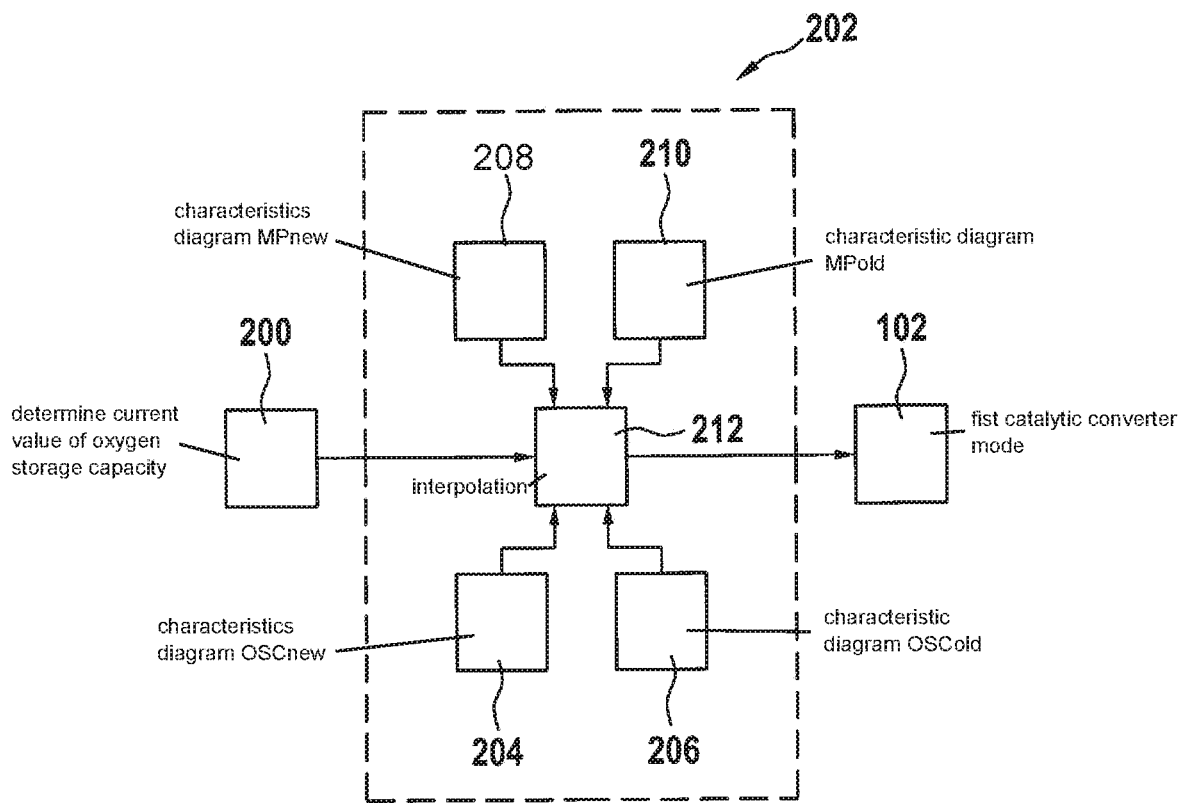
FIG. 4 illustrates ascertainment and allocation of a single model parameter to a currently determined aging state of catalytic converter 26.

FIG. 4 illustrates the manner in which an individual model parameter MP is ascertained and allocated to a currently determined aging state OSCcurr of catalytic converter 26. Block 200 represents the determination of a current value OSCcurr of the oxygen storage capacity of catalytic converter 26. Block 202 has sub-blocks 204, 206, 208, 210, and 212. Block 204 represents a characteristics diagram in which basic values OSCnew as a function of the exhaust gas mass flow and the catalytic converter temperature are stored. Block 206 represents a characteristics diagram in which basic values OSCold as a function of the exhaust gas mass flow and the catalytic converter temperature are stored.

Block 208 represents a characteristics diagram in which basic values MPnew of a model parameter MP as a function of the exhaust gas mass flow and the catalytic converter temperature are stored. Block 210 represents a characteristics diagram in which basic values MPold of a model parameter MP as a function of the exhaust gas mass flow and the catalytic converter temperature are stored.

Block 212 represents the interpolation, explained with reference to FIG. 3, with which an interpolated regulation parameter, constituting the model parameter MPcurr relevant to the current storage capacity OSCcurr, is conveyed to catalytic converter model 102.

This method, explained for one regulation parameter MP, is preferably carried out for each regulation parameter MP that is to be adapted to changing catalytic converter temperatures and/or exhaust gas mass flows in order to ensure desirably accurate modeling.

Examples of such regulation parameters are reaction constants (coefficients) of reaction equations that describe the storage, release, and conversion of reducing exhaust-gas components (e.g. CO, HC) and storage, release, and conversion of oxidizing exhaust-gas components (e.g. oxygen). Parameters of the control loops, and adaptation of the control loops to the aging state of the catalytic converter, are preferably also adapted in order to optimize emissions. This is achieved, for instance, by the fact that a fill level setpoint of the catalytic converter with oxygen is defined as a function of an aging of the catalytic converter.

Figure 5:
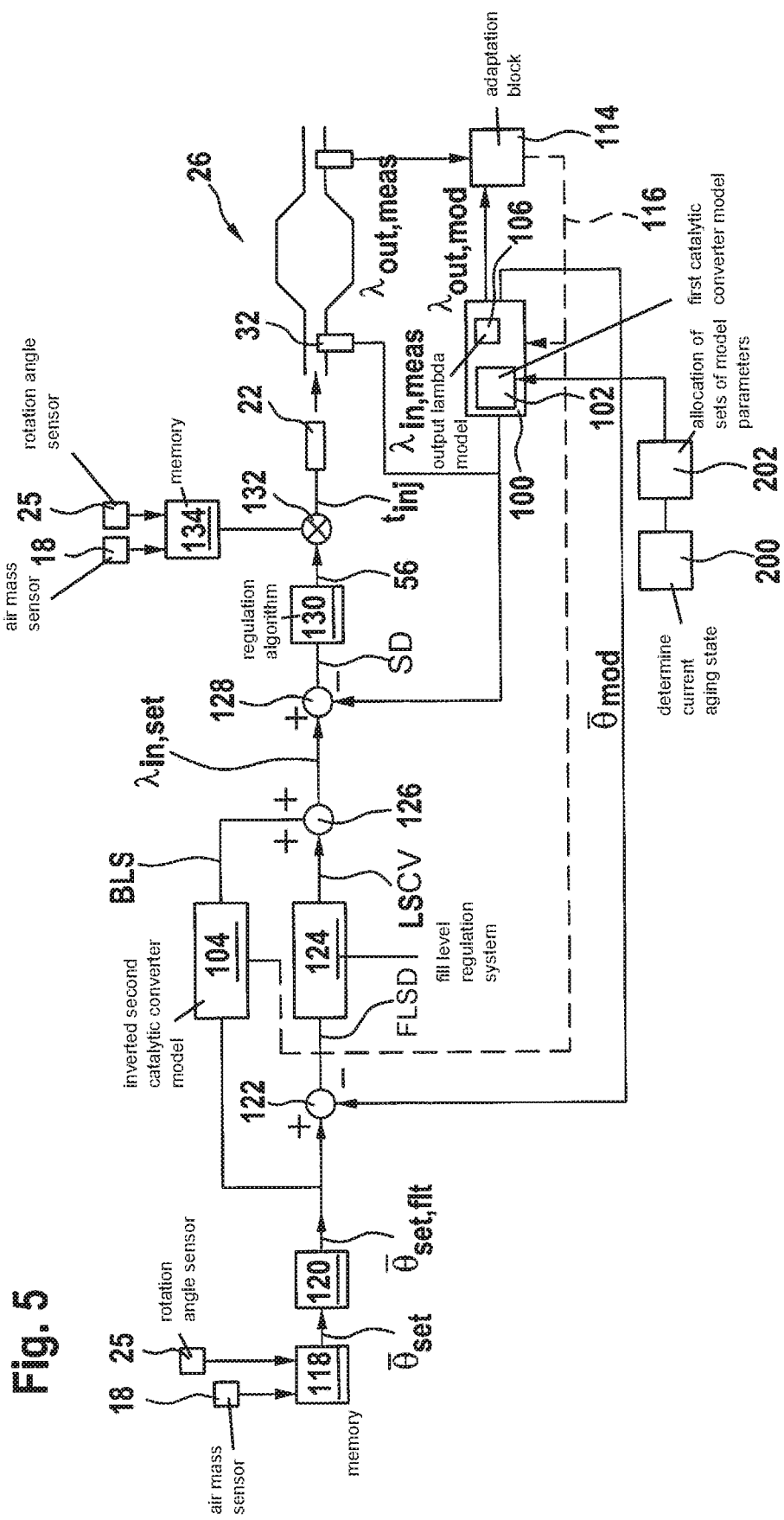
FIG. 5 is a functional block depiction of an exemplifying embodiment of a method according to the present invention.

FIG. 5 is a functional block depiction of an exemplifying embodiment of a method according to the present invention, together with apparatus elements that act on the functional blocks or are influenced by the functional blocks.

In specific, FIG. 5 shows the manner in which the signal $\lambda_{out,mod}$ of rear exhaust gas probe 34 modeled by output lambda model 106 is reconciled with the real output signal $\lambda_{out,meas}$ of rear exhaust gas probe 34. For this, the two signals $\lambda_{out,mod}$ and $\lambda_{out,meas}$ are delivered to an adaptation block 114. Adaptation block 114 compares the two signals $\lambda_{out,mod}$ and $\lambda_{out,meas}$ with one another. For example, a step-change lambda probe that is disposed after three-way catalytic converter 26 and constitutes exhaust probe 34 indicates unequivocally when three-way catalytic converter 26 is completely filled with oxygen or completely emptied of oxygen. This can be utilized, after lean or rich phases, to bring the modeled oxygen fill level into agreement with the actual oxygen fill level, or to bring the modeled output lambda $\lambda_{out,mod}$ into agreement with the lambda $\lambda_{out,meas}$ measured after three-way catalytic converter 26, and to adapt system model 100 in the event of deviations. Adaptation is accomplished, for instance, by the fact that adaptation block 114 successively modifies parameters of the algorithm of system model 100, via adaptation path 116 depicted as a dashed line, until the lambda value $\lambda_{out,mod}$ modeled for the exhaust gas flowing out of three-way catalytic converter 26 corresponds to the lambda value $\lambda_{out,meas}$ measured there.

Inaccuracies in measured or modeled variables that participate in system model 100 are thereby compensated for. From the fact that the modeled value $\lambda_{out,mod}$ corresponds to the measured lambda value $\lambda_{out,meas}$, it can be inferred that the fill level $\overline{\theta}_{mod}$ modeled with system model 100, or with first catalytic converter model 102, also corresponds to the fill level (not measurable with onboard means) of three-way catalytic converter 26. It can then further be inferred that second catalytic converter model 104, which is inverse to first catalytic converter model 102 and is obtained by mathematical transformation from the algorithm of first catalytic converter model 102, also correctly describes the behavior of the system that is being modeled.

In the context of the present invention, this is utilized in order to calculate a baseline lambda setpoint using the inverse second catalytic converter 104. For this, a fill level setpoint value $\overline{\theta}_{set,flt}$ filtered by an optional filtering function 120 is delivered as an input variable to inverse second catalytic converter model 104. Filtering function 120 is performed for the purpose of permitting only those changes to the input variable of inverse second catalytic converter model 104 which the controlled system as a whole can follow. An as-yet unfiltered setpoint $\overline{\theta}_{set}$ is read out from a memory 118 of control unit 16. Memory 118 is preferably addressed for that purpose with current operating characteristic values of internal combustion engine 10. The operating characteristic values are, for instance but not obligatorily, the rotation speed (detected by rotation speed sensor 25) and the load (detected by air mass sensor 18) of internal combustion engine 10.

The filtered fill level setpoint $\overline{\theta}_{set,flt}$ is processed by the inverse second catalytic converter model 104 to yield a baseline lambda setpoint BLS. In parallel with this processing, in an associating function 122 a fill level system deviation FLSD is calculated, constituting the deviation of the modeled fill level $\overline{\theta}_{mod}$, modeled with system model 100 or with first catalytic converter model 102, from the filtered fill level setpoint $\overline{\theta}_{set,flt}$. This fill level system deviation FLSD is delivered to a fill level regulation algorithm 124 that calculates therefrom a lambda setpoint correction value LSCV. This lambda setpoint correction value LSCV is added, in associating function 126, to the baseline lambda setpoint BLS calculated by inverse system model 104.

In a preferred embodiment, the sum thereby arrived at serves as a setpoint $\lambda_{in,set}$ of a conventional lambda regulation system. In an associating function 128, the actual lambda value $\lambda_{in,meas}$ furnished by first exhaust gas probe 32 is subtracted from this lambda setpoint $\lambda_{in,set}$. The system deviation SD thereby calculated is converted by a usual regulation algorithm 130 into a control variable CV that, in an associating function 132, is associated, for example by multiplication, with a baseline value BV, predetermined as a function of operating parameters of internal combustion engine 10, of an injection pulse width $t_{inj}$. The baseline values BV are stored in a memory 134 of control unit 16. Here as well, the operating parameters are preferably, but not obligatorily, the load and the rotation speed of internal combustion engine 10. Using the injection pulse width $t_{inj}$ resulting from the product, fuel is injected via injection valves 22 into combustion chambers 20 of internal combustion engine 10.

The conventional lambda regulation system is thereby overlaid with a regulation of the oxygen fill level of catalytic converter 26. The average oxygen fill level $\overline{\theta}_{mod}$ modeled using system model 100 or first catalytic converter model 102 is corrected, for instance, to a setpoint $\overline{\theta}_{set,flt}$ that minimizes the probability of breakouts toward lean and rich, and thus results in minimal emissions. Because the baseline lambda setpoint BLS is calculated by inverted second system model 104, the system deviation of the fill level regulation system becomes equal to zero when the modeled average fill level $\overline{\theta}_{mod}$ is identical to the prefiltered fill level setpoint $\overline{\theta}_{set,flt}$. Fill level regulation algorithm 124 intervenes only when this is not the case. Because the calculation of the baseline lambda setpoint, which acts to a certain extent as a pilot control system for the fill level regulation system, is realized as an inverted second catalytic converter model 104 of first catalytic converter model 102, this pilot control system can be adapted, analogously to the adaptation of first catalytic converter model 102, on the basis of the signal $\lambda_{in,meas}$ of second exhaust gas probe 34 disposed after three-way catalytic converter 26. This is illustrated in FIG. 3 by the branch of adaptation path 116 which leads to inverted system model 104.

All the elements depicted in FIG. 5, with the exception of exhaust gas system 26, exhaust gas probes 32, 34, air mass sensor 18, rotation angle sensor 25, and injection valves 22, are constituents of a control unit 16 according to the present invention. All the other elements of FIG. 3, with the exception of memories 118, 134, are parts of engine control program 16.1 that is stored, and executes, in control unit 16.

Elements 22, 32, 128, 130, and 132 constitute a first control loop in which a lambda regulation process occurs in which the signal $\lambda_{in,meas}$ of first exhaust gas probe 32, constituting an actual lambda value, is processed. The lambda setpoint $\lambda_{in,set}$ of the first control loop is calculated in a second control loop that has elements 22, 32, 100, 122, 124, 126, 128, 132.

What is claimed is:

1. A method for regulating, during operation of an internal combustion engine, a filling of an exhaust gas component reservoir of a catalytic converter in exhaust of the internal combustion engine, the method comprising:
provide, to a first catalytic converter model, in addition to further signals, a signal of a first exhaust gas probe, wherein the first exhaust gas probe projects into an exhaust gas flow upstream from the catalytic converter and detects a concentration of an exhaust gas component;
ascertaining, by the first catalytic converter model, an actual fill level of the exhaust gas component reservoir;
calculating a lambda setpoint;
converting a predetermined fill level setpoint into a baseline lambda setpoint;
ascertaining and processing, by a fill level regulation system, a deviation of the actual fill level from the predetermined fill level setpoint to yield a lambda setpoint correction value;
calculating a sum from the baseline lambda setpoint and the lambda setpoint correction value;
calculating, using the sum, a correction value with which a metering of fuel to at least one combustion chamber of the internal combustion engine is corrected;
determining an aging state of the catalytic converter; and
allocating a set of model parameters of the first catalytic converter model to the aging state, each of the model parameters of the set of model parameters of the first catalytic converter model being ascertained by interpolation from basic values of model parameters, the basic values having been determined for at least two different aging states of a second catalytic converter of identical design as the catalytic converter.

2. The method as recited in claim 1, wherein:
the exhaust gas component is oxygen;
in a first control loop, a lambda regulation operation occurs in which the signal of the first exhaust gas probe is processed as an actual lambda value; and
the lambda setpoint is calculated in a second control loop;
the predetermined fill level setpoint is converted, by a second catalytic converter model inverse to the first catalytic converter model, into the baseline lambda setpoint of the lambda control system; and
in parallel with the conversion of the predetermined fill level, a fill level system deviation is calculated as the deviation of the fill level, modeled with the first catalytic converter model, from the filtered fill level setpoint;
the fill level system deviation is delivered to a fill level regulation algorithm that calculates therefrom the lambda setpoint correction value;
the lambda setpoint correction value is added to the baseline lambda setpoint calculated by the inverse second catalytic converter model; and
and the sum constitutes the lambda setpoint.

3. The method as recited in claim 1, wherein the first catalytic converter model is a constituent of a system model that includes an initial lambda model in addition to the first catalytic converter model.

4. The method as recited in claim 1, wherein the first catalytic converter model has an input emissions model and a fill level and emissions model, and the allocation of model parameters occurs individually for the input emissions model and for the fill level and emissions model.

5. The method as recited in claim 1, wherein the basic values predetermined for the at least two different aging states of the second catalytic converter of identical design as the catalytic converter are oxygen storage capacities.

6. The method as recited in claim 5, wherein the oxygen storage capacities are determined for various operating points that are defined by exhaust gas mass flow and catalytic converter temperature, and are stored in characteristics diagrams in the control unit.

7. The method as recited in claim 6, wherein the basic values of model parameters are stored in characteristics diagrams.

8. The method as recited in claim 7, wherein a current oxygen storage capacity is determined repeatedly at predetermined intervals by an onboard diagnosis system.

9. The method as recited in claim 8, wherein basic values of an oxygen storage capacity and of a model parameter are determined with reference to a current oxygen capacity determined for an exhaust gas mass flow and a catalytic converter temperature, and a relevant current value of the model parameter is ascertained by interpolation for the exhaust gas mass flow and the catalytic converter temperature, and for the relevant current oxygen storage capacity.

10. The method as recited in claim 8, wherein, wherein basic values of an oxygen storage capacity and of each model parameter are determined with reference to a current oxygen capacity determined for an exhaust gas mass flow and a catalytic converter temperature, and relevant current values of the model parameters are ascertained by interpolation for the exhaust gas mass flow and the catalytic converter temperature, and for the relevant current oxygen storage capacity.

11. The method as recited in claim 10, wherein: (i) one of the model parameters is a reaction constant of a reaction equation which describes a storage, release, and conversion of reducing exhaust gas components, or (ii) one of the model parameters is a reaction constant of a reaction equation which describes a storage, release, and conversion of oxidizing exhaust gas components.

12. The method as recited in claim 1, wherein a fill level setpoint of the catalytic converter with oxygen is defined as a function of an aging of the catalytic converter.

13. A control unit configured to regulate, during operation of an internal combustion engine, a filling of an exhaust gas component reservoir of the catalytic converter in the exhaust of an internal combustion engine, the control unit configured to:
provide, to a first catalytic converter model, in addition to further signals, signals of a first exhaust gas probe to ascertain, using the first catalytic converter model, an actual fill level of the exhaust gas component reservoir, wherein the first exhaust gas probe projects into an exhaust gas flow upstream from the catalytic converter and detects a concentration of an exhaust gas constituent;
calculate a lambda setpoint;
convert a predetermined fill level setpoint into a baseline lambda setpoint;
ascertain and process, using a fill level regulation system, a deviation of the actual fill level from the predetermined fill level setpoint, to yield a lambda setpoint correction value;
calculate a sum from the baseline lambda setpoint and the lambda setpoint correction value;

use the sum to calculate a correction value, and correct, using the correction value, a metering of fuel to at least one combustion chamber of the internal combustion engine;

determine an aging state of the catalytic converter;

allocate to the aging state a set of model parameters of the first catalytic converter model; and ascertain each of the model parameters of the set of model parameters of the first catalytic converter model by interpolation from basic values of model parameters, the basic values having been determined for at least two different aging states of a second catalytic converter of identical design as the catalytic converter.

14. The control unit as recited in claim 13, wherein:

the exhaust gas component is oxygen;

in a first control loop, a lambda regulation operation occurs in which the signal of the first exhaust gas probe is processed as an actual lambda value; and the lambda setpoint is calculated in a second control loop;

the predetermined fill level setpoint is converted, by a second catalytic converter model inverse to the first catalytic converter model, into the baseline lambda setpoint of the lambda control system; and in parallel with the conversion of the predetermined fill level, a fill level system deviation is calculated as the deviation of the fill level, modeled with the first catalytic converter model, from the filtered fill level setpoint;

the fill level system deviation is delivered to a fill level regulation algorithm that calculates therefrom the lambda setpoint correction value;

the lambda setpoint correction value is added to the baseline lambda setpoint calculated by the inverse second catalytic converter model; and and the sum constitutes the lambda setpoint.

* * * * *